United States Patent [19]

Tabatabaie-Raissi

[11] Patent Number: 5,296,110
[45] Date of Patent: Mar. 22, 1994

[54] APPARATUS AND METHOD FOR SEPARATING OXYGEN FROM AIR

[75] Inventor: Ali Tabatabaie-Raissi, Melbourne, Fla.

[73] Assignee: University of Central Florida, Orlando, Fla.

[21] Appl. No.: 919,153

[22] Filed: Jul. 23, 1992

Related U.S. Application Data

[63] Continuation-in-part of Ser. No. 637,777, Jan. 7, 1991, abandoned.

[51] Int. Cl.[5] ............................................. C25B 1/02
[52] U.S. Cl. ................................................ 204/129
[58] Field of Search .................... 204/59 R, 258, 263, 204/283, 129; 55/2; 429/30, 31

[56] References Cited

U.S. PATENT DOCUMENTS

| | | | |
|---|---|---|---|
| 3,400,054 | 9/1968 | Ruka et al. | 204/1 |
| 3,410,783 | 11/1968 | Tomter | 204/266 |
| 4,131,514 | 12/1978 | Cheng et al. | 204/129 |
| 4,300,987 | 11/1981 | Tseung et al. | 204/129 |
| 4,416,758 | 11/1983 | Tseung et al. | 204/258 |
| 4,755,272 | 7/1988 | Plowman | 204/296 |
| 4,801,359 | 1/1989 | Jeanne et al. | 204/59 R |
| 4,959,131 | 9/1990 | Cook et al. | 204/282 |

OTHER PUBLICATIONS

Fee et al.; "Monolithic Fuel Cell Development"; Argonne National Laboratory; pp. 40–43.

*Primary Examiner*—Kathryn Gorgos
*Attorney, Agent, or Firm*—James H. Beusse

[57] ABSTRACT

A process and apparatus for separating and concentrating breathing-grade oxygen, that is therapeutically equivalent to 100% pure oxygen, from ambient air is provided. The oxygen concentrating process employed in the method of the invention is implemented in a housing having a main chamber. A solid anion conducting membrane is situated in the main chamber so as to divide the chamber into separate first and second reaction chambers. Electrocatalytically active cathodic and anodic electrodes are situated on the respective opposed surfaces of the membrane. A direct current source is coupled between the cathodic and anodic electrodes such that when ambient air is provided to the cathodic electrode, therapeutically pure and moist oxygen is produced at the anodic electrode by electrolytic action of hydroxyl ions passing through the solid membrane. The oxygen concentrator advantageously operates at room temperature making it well suited for production of therapeutic oxygen especially for applications where portable oxygen source is required.

2 Claims, 3 Drawing Sheets

DIRECTION OF GRAVITATIONAL FIELD

APPARATUS AND METHOD FOR SEPARATING OXYGEN FROM AIR

This is a continuation-in-part of application Ser. No. 07/637,777, filed Jan. 7, 1991, now abandoned.

BACKGROUND OF THE INVENTION

This invention relates in general to techniques for separating a selected gas from a mixture of gases and, more particularly, to an apparatus and method for separating oxygen from other gases by employing electrolytic systems.

Electrolytic systems such as fuel cells and electrolyzers are known. Fuel cells typically include cathode and anode electrodes situated in, and separated by, an electrolyte. The electrolyte may be either solid or liquid. In contrast to batteries which actually store electrical energy in a chemical form, fuel cells are structures in which the reactants and the reactant products are continuously supplied and removed to produce electricity. More specifically, a fuel and an oxidant are continuously supplied to the fuel cell so as to react and thereby directly produce an electrical potential between the cathode and anode electrodes. Thus, a fuel cell is generally regarded as being an energy converter whereas a battery is considered to be an energy source.

Electrolyzers, like fuel cells, also employ cathode and anode electrodes situated in an electrolyte. However, in an electrolyzer a source of DC current is supplied between these electrodes such that the electrolyte is separated or decomposed into its component ions via electrolytic action.

Devices which electrolytically concentrate gases are related in general principle to the fuel cell and the electrolyzer technologies discussed above. Fuel cells or electrolyzers are generally classified according to the type of electrolyte which they use to sustain electrolytic conduction between the cathode and anode thereof. Thus, we have either acidic or alkaline fuel cells or electrolyzers depending on the particular electrolyte employed. These acidic or alkaline types of fuel cells or electrolyzers employ negative and/or positive charge ion conducting electrolytes through which charged ions (anions or cations) are transported. Electrolytic systems most often used in the past contained electrolytes that were aqueous or molten salt solutions. Examples of such systems include alkaline (KOH or NaOH) electrolyzers and fuel cells, molten carbonate electrolyzers and phosphoric acid fuel cells. Modern electrolyzers and fuel cells contain solid state electrolytes fabricated from organic compounds such as NAFION (perfluorinated sulfonate ionomer) which is manufactured by DuPont or are fabricated from inorganic compounds such as zirconium oxide.

Electrolytic gas concentrator devices, such as oxygen concentrators, are known in the prior art and typically include a cathode and anode electrode situated in an electrolyte, in a manner somewhat similar to the fuel cell and electrolyzer structures discussed above. In such oxygen concentrators, a source of DC voltage is typically coupled between these electrodes. These oxygen concentrators are known to employ either liquid or solid electrolytes. The nature of the selected electrolyte between the cathode and anode electrodes is such that gases other than oxygen cannot be transferred electrolytically through the electrolyte. Thus, the gas obtained at the anode is substantially pure oxygen whereas the gas obtained at the cathode is a nitrogen rich sample of air. Electrolytic oxygen concentrators capable of producing medical grade oxygen for patient use are very desirable; however, the processes and structures discussed above have a number of deficiencies which make them generally inappropriate for this application. For example, electrolytic oxygen concentrators which employ solid oxide electrolytes typically require very expensive, all solid state fabrication and employ rare earth elements. Additionally, these concentrators often operate at relatively high temperatures to assure adequate ion conductivity in the solid electrolyte. Moreover, alkaline oxygen concentrator systems are susceptible to carbonation by carbon dioxide in the ambient air. Additionally, such alkaline concentrator systems are also susceptible to contamination of the output oxygen by the hazardous alkali vapor emitted from the caustic electrolyte. Elaborate components are often required to provide electrolyte recirculation in these concentrators as well as to provide heat exchange and filtration.

For all these reasons, prior electrolytic oxygen concentrators have been very complex and generally inappropriate for low cost home and ambulatory patient oxygen use.

SUMMARY OF THE INVENTION

Accordingly, one object of the present invention is to provide a process for electrolytically concentrating oxygen which operates at or near ambient temperatures and pressures.

Another object of the present invention is to provide a process for electrolytically concentrating oxygen which substantially eliminates the need to replenish the electrolyte.

Yet another object of the present invention is to provide a process for electrolytically concentrating oxygen which does not require undue maintenance.

Still another object of the present invention is to provide a process for electrolytically concentrating oxygen which is relatively low cost and suitable for concentrating oxygen for therapeutic patient use.

A still further object of the invention is to provide an apparatus for concentrating oxygen which exhibits a sufficiently small weight and volume that the apparatus is easily portable.

Yet another object of the invention is to provide an apparatus for concentrating oxygen which is capable of operating on relatively low DC voltage such as the 12 volts which is available in most vehicles.

In accordance with the present invention, the process is implemented in an apparatus for separating mostly oxygen from air, such apparatus including a housing enclosing a main chamber. The apparatus further includes a solid anion conducting material electrolyte having opposed first and second surfaces. The electrolyte is situated within the main chamber and divides the main chamber into separate first and second reaction chambers. The apparatus also includes a cathode electrode situated on the first surface of the electrolyte and further situated in the first reaction chamber. The apparatus still further includes an anode electrode situated on the second surface of the electrolyte and further situated in the second reaction chamber. An air inlet provides air from outside the housing through the housing to the first reaction chamber. An oxygen outlet is provided for exhausting oxygen from the second reaction chamber through the housing to outside the housing. A direct current source is coupled between the cathode and anode electrodes such that when air is provided to the cathode electrode, oxygen is produced at the anode electrode by electrolytic action of hydroxyl ions or protons passing through the electrolyte.

One important feature of this apparatus is that a small portion of ambient air in the first reaction chamber is allowed to directly pass through, around the rim of the membrane, to the second reaction chamber, diluting the output oxygen in a concentration range varying between no less than 85% (by volume) oxygen and no more than 95% (by volume) pure oxygen.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings:

DETAILED DESCRIPTION OF THE INVENTION

Figure 1:
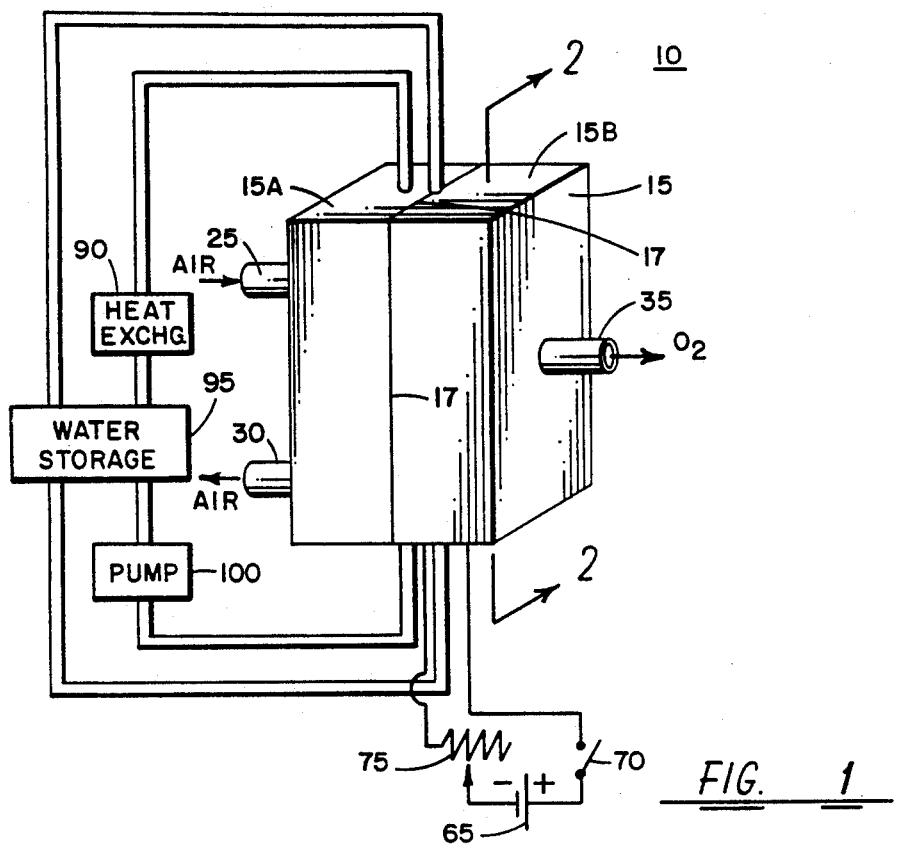
FIG. 1 is a block diagram of a planar embodiment of an electrolytic oxygen concentrator using the process of the present invention.

FIG. 1 shows a block diagram of an electrolytic oxygen concentrator 10 for implementing the process of the present invention. In this particular embodiment of the invention, concentrator 10 is depicted as having a parallelepiped/planar configuration. Those skilled in the art will appreciate that concentrator 10 may exhibit other geometries, such as cylindroidal for example, as long as such other geometries are consistent with the teachings herein.

Concentrator 10 includes a housing 15 which in one embodiment is fabricated in the form of a two piece LUCITE (polymethyl methacrylate) shell including housing portions 15A and 15B. LUCITE is a trademark of its respective owner.) These housing portions 15A and 15B are sandwiched together in a planar relationship as depicted in FIG. 1. A main chamber (not visible in FIG. 1) is situated within housing 15 for implementing the later described electrolytic reaction.

Air is supplied to inlet pipe 25 and is withdrawn from outlet pipe 30 as indicated in FIG. 1. Substantially pure oxygen in the range of 85 to 95 percent by volume is exits oxygen outlet pipe 35. The operation of concentrator 10 both internal and external to housing 15 is discussed in detail in the subsequent discussion of FIG. 2.

Figure 2:
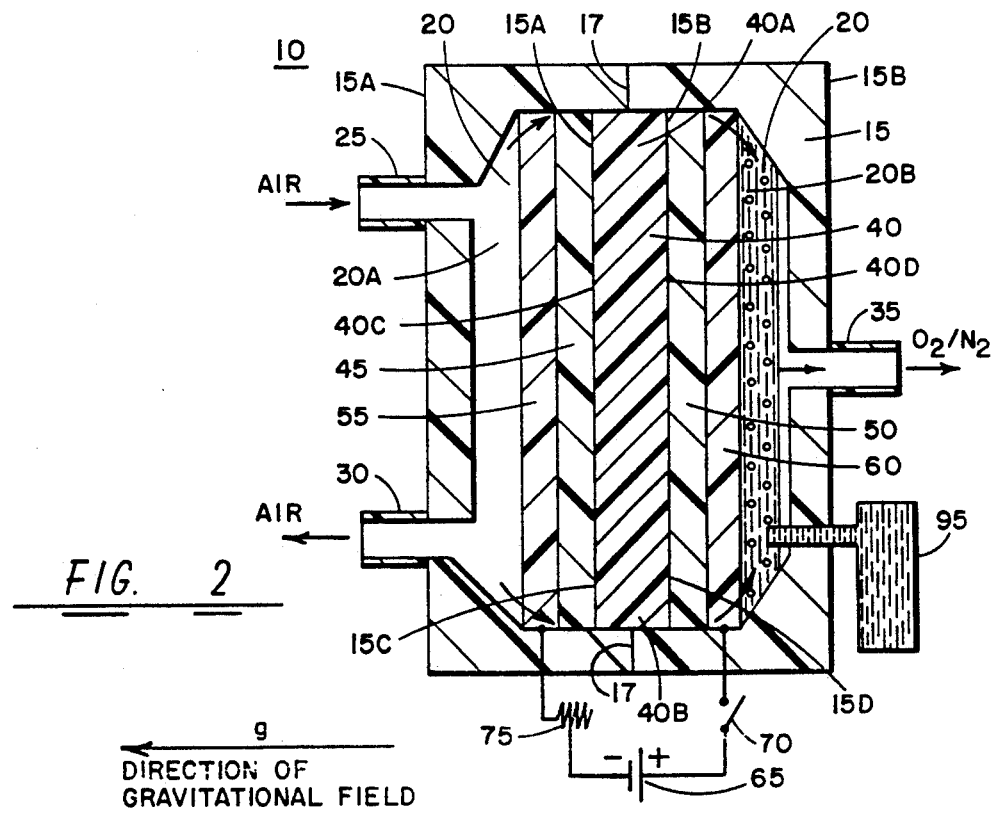
FIG. 2 is a simplified cross-sectional view of the electrolytic oxygen concentrator process of FIG. 1 taken along section line 2—2.

FIG. 2 shows a cross-sectional view of the electrolytic oxygen concentrator 10 of FIG. 1 taken along section line 2—2. Housing 15 of concentrator 10 includes housing portions 15A and 15B which mate with each other along interface 17 as depicted in FIG. 1. Returning to FIG. 2, it is seen that the aforementioned main chamber within housing 15 is actually two separate reaction chambers, namely a cathodic chamber 20A which is separated from an anodic chamber 20B. As seen in FIG. 2, air inlet pipe 25 leads from the ambient surroundings of concentrator 10 into cathodic chamber 20A and supplies chamber 20A with a fresh supply of air. Air outlet pipe 30 leads from chamber 20A to the ambient surroundings such that already processed air is exhausted from chamber 20A as illustrated. Oxygen outlet pipe 35 leads from chamber 20B to provide separated oxygen to the user.

In this particular embodiment, a solid electrolyte 40 is situated substantially centrally within chamber 20 and is held in position between upper housing walls 15A and 15B at the top 40A of electrolyte 40, and is further held in position between lower housing walls 15C and 15D at the bottom 40B of electrolyte 40. Electrolyte 40 includes opposed major surfaces 40C and 40D wherein surface 40C faces air inlet pipe 25 and outlet pipe 30, and wherein surface 40D faces pure oxygen outlet pipe 35.

Electrolyte 40 is preferably fabricated from an anion conducting material such as an anion conducting membrane. Anions are defined as those ions which are attracted to the anode of an electrolytic chemical system. Alternatively, electrolyte 40 could be fabricated from a cation conducting material, such as Nafion. More particularly, a solid polymer electrolyte (SPE) material such as fluorocarbon polymer may be employed as electrolyte 40. That is, solid electrolyte perfluorosulfunic acid type membranes may be employed as electrolyte 40. One anion conducting membrane material which has been found to be suitable for use as electrolyte 40 is the TOSFLEX (sulfonamide derivativce of perfluorocarbon sulfonic acid ionomer) membrane manufactured by the Tosoh Company of Japan. This membrane material is a solid polymer material.

A catalytic electrode 45 is situated on electrolyte surface 40C. Catalytic electrode 45 is the cathode of concentrator 10. Another catalytic electrode 50 is situated on electrolyte surface 40D. Catalytic electrode 50 is the anode of concentrator 10.

A current collecting electrode 55 is situated on catalytic electrode 45 as shown. Another current collecting electrode 60 which is perforated is situated on catalytic electrode 50.

A source 65 of direct current (DC) power is coupled between current collecting electrodes 55 and 60. More specifically, a battery is employed as source 65. The positive terminal of such battery is coupled to current collecting electrode 60 via a switch 70. The negative terminal of the battery is coupled to current collecting electrode 55 via a rheostat 75 which can be adjusted to control the amount of electric current supplied to concentrator 10.

It is thus observed in FIG. 1 that a planar sandwich-like structure is formed by current collecting electrodes 55 and 60, catalytic cathode and anode electrodes 45 and 50, and solid polymer electrolyte 40.

Concentrator 10 employs the following chemical reactions to separate oxygen from air. In this particular embodiment of the invention, the process is a 4 electron process. More particularly, the reaction at cathode 45 is summarized as:

EQUATION 1

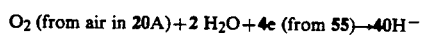

$O_2$ (from air in 20A) $+ 2 H_2O + 4e$ (from 55) $\rightarrow 4OH^-$

Upon the occurrence of the reaction described in Equation 1, the $OH^-$ anion species permeates and migrates through electrolyte 40 to anode 50 where the reverse of the above reaction occurs as described by Equation 2.

EQUATION 2

$4OH^- \rightarrow O_2$ (liberated to 20B) $+ 2 H_2O + 4e$ (from 60)

Oxygen is thus produced in reaction chamber 20B and is exhausted out output pipe 35 for therapeutic patient use. It should be noted that a portion of the air in the first reaction chamber 20A is allowed to flow through the current collecting electrode 55 and catalytic electrode 45, around the rim of the electrolyte 40 and through the current collecting electrode 60 and catalytic electrode 50, to the second reaction chamber 20B, diluting the output oxygen to a level between no less than 85% (by volume) and no more than 95% (by volume) pure oxygen.

Figures 3, 4:
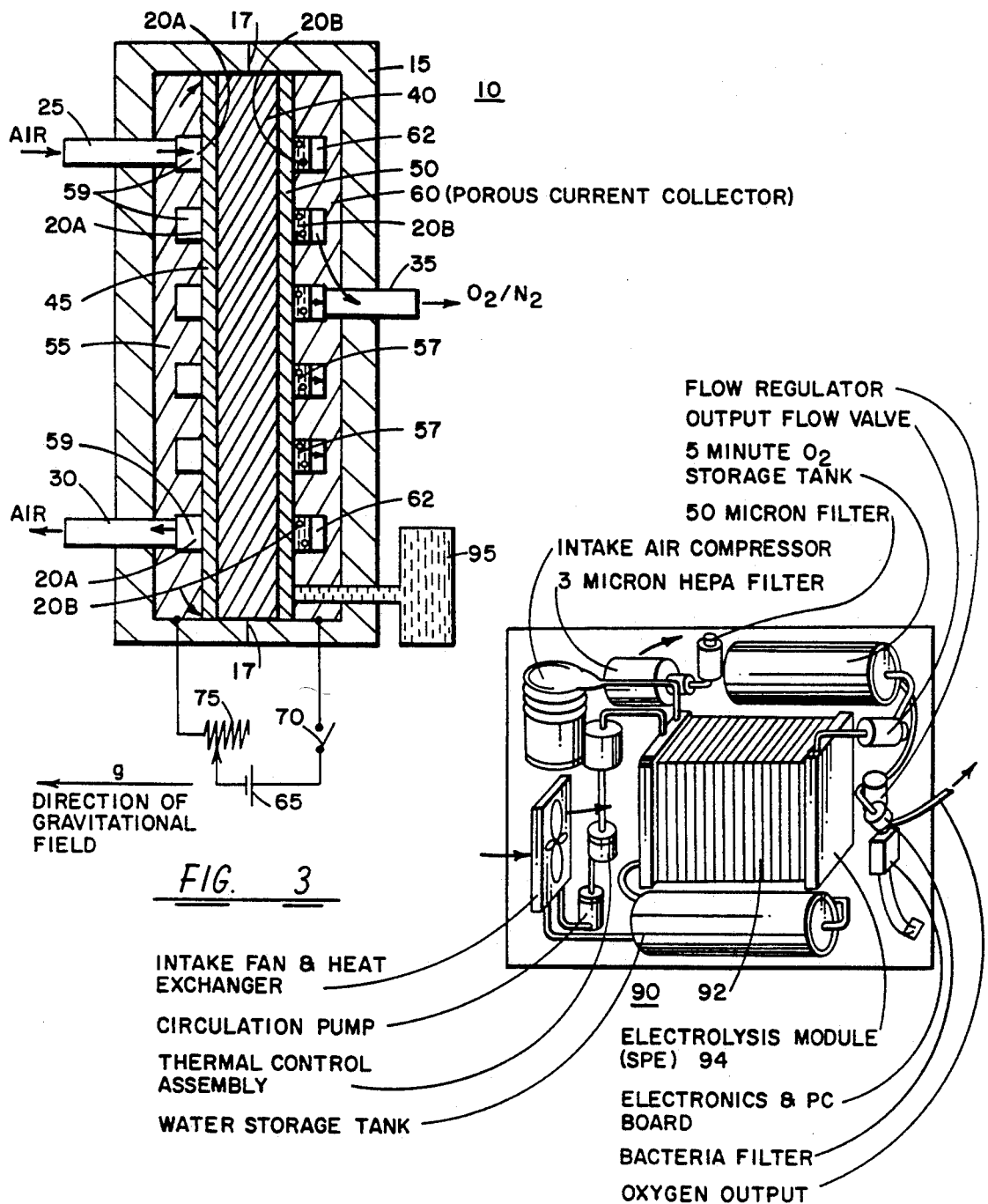
FIG. 3 is a more detailed cross-sectional view of the oxygen concentrator process of FIG. 1.
FIG. 4 is a schematic view of a portable system embodiment of the electrolytic concentrator of the present invention.

A more detailed cross-section of concentrator 10 of FIGS. 1 and 2 is shown in FIG. 3. Like numbers are used to indicate like elements in FIGS. 1, 2 and 3, referred to jointly. The electrolytic reaction generates heat at cathode 45 which must be dissipated. For this purpose, current collecting electrode 55 which is adjacent cathode 45 includes a plurality of coolant carrying channels or ducts 57. Channels 57 are interconnected within current collecting electrode 55 such that coolant flows throughout electrode 55 to remove heat therefrom. Water may be employed as the coolant for concentrator 10. As seen in FIG. 3, the uppermost channel 57 is coupled to a heat exchanger 90 by appropriate piping. In this manner, heat carried by the coolant is removed from the coolant before the coolant reaches a storage tank 95 connected to heat exchanger 90. Heat exchanger 90 is connected to compartment 95 to permit the storage of cooled coolant therein. A pump 100 (FIG. 1) is connected to storage tank 95 and to the lowermost channel 57 in concentrator 10 to pump coolant back into concentrator 10. In this manner, a continuous flow of coolant is provided through channels 57 to remove heat from current collecting electrode 55 and cathode 45.

Also as seen in FIG. 3, storage tank 95 is connected between the uppermost portion of electrolyte 40 and the lowermost portion of electrolyte 40 by appropriate piping. Storage tank 95B and the connecting piping to electrolyte 40 are filled with water to keep the solid polymer electrolyte 40 fully saturated as discussed later in more detail.

A plurality of channels or cross flow air passages 59 are situated extending throughout current collecting electrode 55. Channels 59 open upon cathode 45 such that fresh air is provided to cathode 45 at which the reaction of Equation 1 takes place. Inlet pipe 25 is connected to the uppermost air passage 59 to provide fresh air thereto and to the remaining channels 59 connected thereto. Outlet pipe 30 is coupled to the lowermost air passage 59 to allow spent air to escape from concentrator 10. Air channels 59 are interconnected to permit fresh air to flow among channels 59 and reach cathode 45.

A plurality of oxygen exhaust passages or channels 62 are situated extending throughout current collecting electrode 60. Channels 62 are interconnected and open upon anode 50 such that oxygen, produced at anode 50 as per the reaction of Equation 2, is provided an exit route from concentrator 10. More specifically, channels 62 are connected to oxygen outlet pipe 35 through which oxygen is exhausted for collection or other use as desired.

In accordance with the invention, only hydroxyl ions ($OH^-$) migrate from catalytic electrode 45 (the cathode) through solid anion conducting polymer electrolyte 40 to catalytic electrode 50 (the anode). Thus, only oxygen gas is given off at electrode 60 for supply to output pipe 35. A mixture of air gases, now less oxygen rich, remains at electrode 55 for exhausting out of exhaust pipe 30. Air is continually circulated through inlet pipe 25 and across electrode 55 and out outlet pipe 30 to provide the oxygen source required for concentrator 10.

While a process for producing oxygen therapeutically equivalent to 100% pure oxygen from air has been described above, it will be appreciated that a method for separating oxygen from air gas has also been disclosed. This method includes the steps of providing a solid anion conducting material electrolyte including opposed first and second surfaces and providing a cathode electrode on the first surface of the electrolyte. The method further includes the steps of providing an anode electrode on the second surface of the electrolyte and providing a direct current source coupled between the cathode and anode electrodes. Air is provided to the cathode electrode such that oxygen is produced at the anode electrode by electrolytic action of hydroxyl ions passing through the electrolyte. This method is advantageously performed at room temperature although satisfactory performance may also be obtained within the temperature range of approximately 20 degrees Celsius to approximately 100 degrees Celsius. The optimum electrolyte temperature is expected to be within the range of approximately 80 degrees Celsius to approximately 85 degrees Celsius.

It is difficult to maintain electrolytic membrane 40 at 100% relative humidity at temperatures above 100 degrees Celsius. For the membrane electrolyte 40 to operate properly, it is necessary to keep electrolyte 40 fully saturated so that undesired membrane dryout and the resulting loss of ionic conductivity therethrough do not occur. It is noted that the best operating temperature for concentrator 10 depends on several factors such as the gas pressure at cathode reaction chamber 20A formed by the interface of channels 59 with cathode 45 and the anode reaction chamber 20B formed by the interface of channels 62 with anode 50, as well as the ionic conductivity of membrane electrolyte 40. For these reasons, it is essential to provide an electrolyte thermal management system such as structures 55, 57, 90, 95A, and 100, and further to provide an electrolyte moisture management system such as structures 40 and 95B.

The minimum voltage required to electrolytically separate oxygen from air is determined from the Nernst equation (Equation 3).

EQUATION 3

$$E = (RT/nF)\ln(P_{O2[anode]}/P_{O2[cathode]})$$

wherein:

R is the gas constant (8.317 $JK^{-1}mol^{-1}$)

T is the temperature (in degrees K)

n is the number of electrons exchanged (four for each oxygen molecule)

F is Faraday's constant (96,485 coulombs $g^{-1}$ or $JV^{-1}g^{-1}$ equivalent)

$P_{O2[anode]}$ is the oxygen partial pressure (in atm.) at the anode 50

$P_{O2[cathode]}$ is the oxygen partial pressure (in atm.) at the cathode 45

The calculated theoretical open circuit voltage between current collecting electrodes 55 and 60 necessary to drive the reactions of Equations 1 and 2 above is determined to be 0.01 volts. This value is determined according to Equation 3 assuming that breathing air is used as the feed gas supplied to inlet pipe 25. It is further assumed for this determination that the oxygen partial pressure at anode 50 ($P_{O2[anode]}$) is 1 atmosphere and that the oxygen partial pressure at cathode 45 ($P_{O2[cathode]}$) is 0.21 atmospheres. The operating temperature, T, is assumed to be room temperature, 20 degrees Celsius.

It is noted, however, that in actual practice the voltage needed to bias concentrator 10 is approximately two orders of magnitude greater than the above determined 0.01 volt theoretical value. This variance is due to the internal resistance of the electrolytic cell formed by concentrator 10 and further due to diffusion and activation limitations under current flow.

The waste heat generated within the cell as a result of the anodic and cathodic overpotentials (concentration, ohmic and activation polarizations) must be properly removed from the cell of concentrator 10 to avoid cell overheating. The amount of such excess heat resulting from the exothermic reaction described in Equation 1 is determined to be $-330.5$ kJ/gmol of oxygen consumed by the cell. Cathode 45 operates at a higher temperature than anode 50 due to the generation of this excess heat. Cathodic cooling to remove this excess heat from concentrator 10 is provided by the thermal management system of structures 55, 57, 90, 95A, and 100.

As described earlier, concentrator 10 also includes an electrolyte moisture (humidity) management system (structures 40, 95B and connective piping therebetween) for preventing dryout of the membrane forming electrolyte 40. In this arrangement, electrolyte 40 is provided with a continuous supply of water in closed loop fashion as seen in FIG. 3 to keep electrolyte 40 saturated or as saturated as possible under given operating conditions. Since a closed loop formed by electrolyte 40, storage tank 95B and interconnective piping is employed in concentrator 10, ions from electrolyte 40 are recirculated through storage tank 95B and are not lost. This moisture management system solves the problem of moisture balance control at the solid polymer electrolyte matrix 40 and in the immediate vicinity of cathode electrode 45 and anode electrode 50. In this manner, electrolyte 40 is maintained under acceptable operating conditions with respect to its ionic conductivity. Without such a moisture management system, the ionic conductivity of solid polymer electrolyte 40 would progressively decrease as concentrator 10 is operated, while the cell resistance of concentrator 10 would simultaneously increase as a result of moisture loss, by entrapment and evaporation, from electrolyte 40 through porous cathode and anode electrodes, 45 and 50, to reaction chambers 20A and 20B.

The gas pressure at cathode 45 (the input pressure at reaction chamber 20A) can be as low as approximately 1 atm. with an optimum value of approximately 5 atm.

Current collecting electrodes 55 and 60 are fabricated from perforated expanded metal screens in one embodiment of the invention. One material which was found to be acceptable to fabricate electrodes 55 and 60 is expanded metal from Exmet, Inc. which employs a nickel sheet having a sheet thickness of 10 mils and a strand width of 58 mils. Alternatively, perforated titanium and stainless steel metals may also be employed to fabricate current collectors 55 and 60. The anodic current collector 60 is plated with gold to prevent corrosion and ohmic losses within the cell. Current collectors 55 and 60 help to distribute current evenly over catalytic cathode electrode 45 and catalytic anode electrode 50. Moreover, current collectors 55 and 60 provide convenient attachment points for connective leads to power source 65.

In one embodiment of the oxygen concentrator, coolant carrying channels 57 which extend throughout current collector 55 may be fabricated from metallic tubing or other heat conductive sealed pipework so as to prevent the coolant from leaking into expanded metal current collector 55 and adjacent regions of the concentrator. In another embodiment of the invention, coolant carrying channels 57 are formed as an integral part of the material used to fabricate collector 55.

When fabricating cathode electrode 45 and anode electrode 50, it is desirable that all reactants have ready access to a large catalytically active interface between electrolyte 40 and current collectors 55 and 60. In concentrator 10, gaseous reactants are present which must physically come into contact with the surface of cathode and anode electrodes 45 and 50 so that charge transfer (oxidation and reduction) can occur. This process is facilitated by the presence of a large area of material which exhibits very high electrocatalytic activity on the surfaces of cathode and anode electrodes 45 and 50.

At cathode electrode 45, the electrocatalyst must be selected to be able to efficiently promote oxygen activation (reduction) through the reaction described in Equation 1 above. Similarly, the electrocatalyst selected for anode electrode 50 must permit efficient oxygen regeneration (evolution). Once charge transfer is accomplished, the electrons flow to or from the respective reaction sites through the electronically conducting electrode material and adjacent current collector.

The oxygen evolution electrode, anode 50, must operate at relatively low oxygen overvoltage. It has been found that a suitable gas permeable anode may be fabricated from PTFE (polytetrafluoroethylene) bonded nickel cobalt oxide ($NiCO_2O_4$) on gold plated 100 mesh nickel screen which exhibits a lower redox potential than the platinum black anodes which are commonly employed in fuel cell/electrolyzer applications. In a preferred embodiment of the invention, the hydrophilic anode 50 is intimately bonded to the solid polymer electrolyte 40 in the form of a very thin nickel cobalt spinel oxide deposit onto which the gold-plated current collector is pressed.

In concentrator 10 of the present invention, it is necessary for cathode electrode 45 to reduce oxygen electrochemically in a manner which results in a high activity for sole production of hydroxyl ions ($OH^-$). It is contemplated that many different materials and cathode designs may be employed as cathode 45 in concentrator 10 consistent with the cathode requirements set forth earlier. One particularly effective gas diffusion electrode that may be employed as cathode 45 is the "Prototech Fuel Cell Electrode" marketed by Electrosynthesis Company, Inc. The hydrophobic cathode electrode 45 of the present invention is fabricated from 0.3 to 0.4 mg/cm$^2$ platinum catalyzed on a carbon cloth support which is 12 to 14 mils thick and made by Electrosynthesis Company, Inc. It should again be understood that other suitable material for fabrication of cathode 45 are contemplated consistent with the guidelines and teachings set forth above.

Based on the above considerations, FIG. 4 illustrates a device or system 90 having at least 10 stacked cells 92 providing at least 95% (by volume) oxygen enriched air, at a flow rate of 0.5 liter per minute for patient use. Based on requiring four Faradays of charge, the current pull of the device is 131 Amps. To operate an individual unit from a 12 VDC car battery, a total of 10 cells, 1.2 VDC each, is required. Assuming a current density of approximately 300 A/ft$^2$, the electrolytic unit 94 will require a total of approximately 64 in$^2$ of membrane/electrode surface area. For the 10 cell unit, each cell would be $2\frac{1}{2}''\times 2\frac{1}{2}''\times 2\frac{1}{2}''$ in size, and would require a total of approximately 157 Watts of power. From these considerations, a conservative estimate of the actual weight of the device is 22 lbs. This figure includes the weight of the cooling unit, support structure, air pump, and control module.

The cell operating pressure and temperature are a few atmospheres and 60°–70° C. Waste heat within the SPEOC (Solid Polymer Electrolytic Oxygen Concentrator) unit can be dissipated in two ways. In one approach, ambient air may be passed continuously through the feed (cathode) side of the cells. This would require approximately 7$\frac{1}{2}$ SCFM (standard cubic feet per minute) of air flow, total, to cool the cells down to about 70° C. Alternatively, it is possible to recirculate the cell electrolyte water (at a rate of approximately 50 ml/min, total) through a simple heat exchanger, attached to the casing. It appears that the later approach should result in a less costly, low weight waste heat handling system. Based on the considerations above, it is estimated the size and weight of the first generation SPEOC units are less than $2'\times 3'\times 1'$ and 22 lbs., respectively.

The foregoing describes a process and system for electrolytically separating oxygen from air which operates at or near ambient temperatures and pressures. The apparatus and method substantially eliminate the need to replenish the electrolyte and requires little maintenance. Moreover, the apparatus and method are relatively low cost and are suitable for concentrating oxygen for therapeutic patient use.

Figure 5:
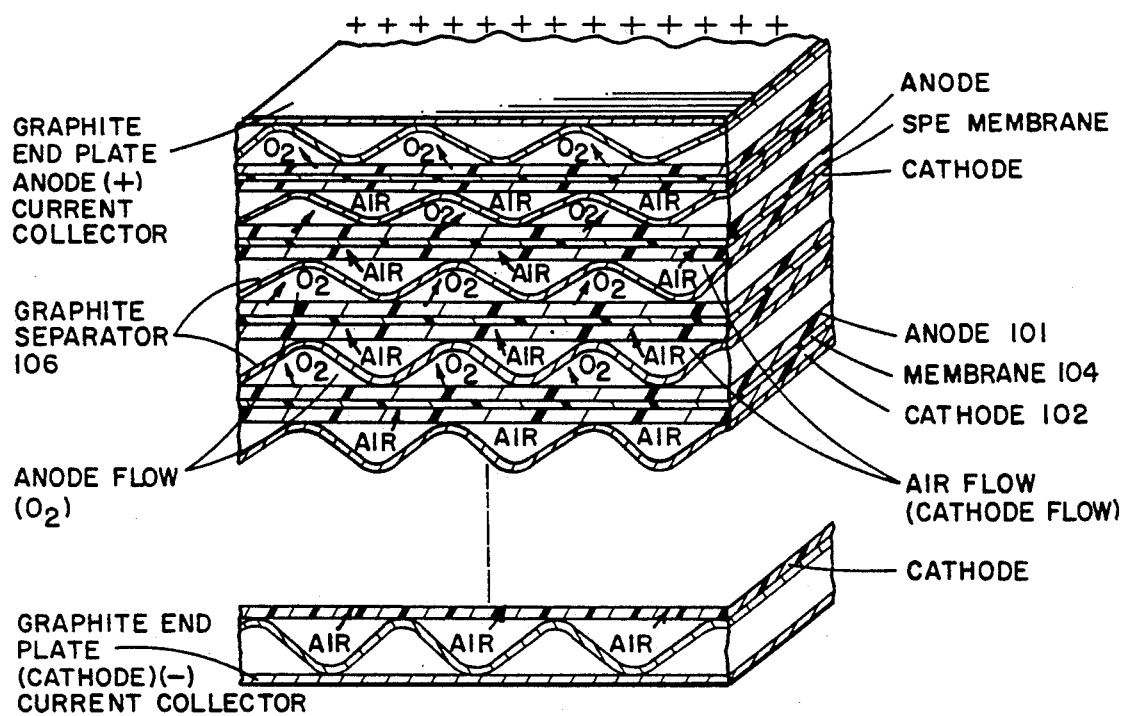
FIG. 5 is an enlarged view of the electrolysis module of FIG. 4.

FIG. 5 illustrates one arrangement of stacked cells for use in the oxygen concentrator of FIG. 4. Each cell comprises an anode platen 101, a cathode plate 102 and a solid polymer membrane 104. The cells are separated by graphite sheets 106. The sheets 106 are formed with a corrugated configuration to create oxygen and air passages between cells. The oxygen is extracted from one side of each cell using manifolds (not shown) at one edge of the stack of cells. Similarly, air is introduced to the opposite side of the cells from another manifold coupled to another edge of the cells. While various numbers of cells can be stacked in this manner, it is convenient to stack ten cells since the voltage drop across a cell is preferably 1.2 volts and ten cells provide a twelve volt drop, twelve volts being a common voltage.

While only certain preferred features of the invention have been shown by way of illustration, many modifications and changes will occur to those skilled in the art. It is, therefore, to be understood that the present claims are intended to cover all such modifications and changes which fall within the true spirit and scope of the invention.

What is claimed is:

1. A process for separating and enriching air with oxygen comprising the steps of:
   providing a solid polymer anion conducting material electrolyte including first and second opposed surfaces;
   providing a cathode electrode on the first surface of the electrolyte;
   providing an anode electrode on the second surface of the electrolyte;
   connecting a direct current source between the cathode and anode electrodes;
   flowing unprocessed ambient air through the electrolyte; producing medical grade output oxygen at the anode electrode by electrolytic action of hydroxyl ions passing through the electrolyte; and
   bypassing a portion of the air flow around the rim of the solid polymer electrolyte for diluting the output oxygen to a level therapeutically equivalent to 100% pure oxygen.

2. The process of claim 1 wherein said steps are performed at a temperature within the range of approximately 20 degrees Celsius to approximately 100 degrees Celsius.

* * * * *